Patented Aug. 9, 1938

2,126,360

UNITED STATES PATENT OFFICE 2,126,360

POLYCYCLIC COMPOUNDS FROM CHRYSENE AND A PROCESS OF PREPARING THEM

Heinrich Vollmann, Frankfort-on-the-Main, and Hans Becker, Hofheim-on-the-Taunus, Germany, assignors to General Aniline Works, Inc., New York, N. Y., a corporation of Delaware No Drawing. Application August 23, 1935, Serial No. 37,599. In Germany September 27, 1934

9 Claims. (Cl. 260—161)

The present invention relates to polycyclic compounds from chrysene and to a process of preparing them.

We have found that new hydrocarbons and halogen derivatives thereof may be obtained by causing anhydrous aluminium chloride or metal chlorides of similar action, such as ferric chloride, to act upon chrysene or halogen chrysenes, whereby two molecules of the chrysene compound are linked together.

By adding, for instance, at ordinary temperature, sublimed aluminium chloride to a suspension of chrysene in benzene, the suspension after a short time assumes an intense carmine red color. If heat is applied, the change of the color occurs at once. By pouring the mass after prolonged heating on the water bath, into dilute hydrochloric acid and removing the benzene with steam, an orange to red-brown crude product is obtained which is practically free from chrysene. By purifying the product according to the statements in the examples following hereafter, a hitherto unknown hydrocarbon is obtained with a yield of about 40 per cent., crystallizing in the form of long golden-yellow needles which melt at 240° C. The molecular weight determination proves clearly that the new hydrocarbon must have been formed from 2 mols of chrysene by condensation, although the melting point of the new product lies about 10° below that of chrysene. It may be concluded from the properties of the product (its color, the color and fluorescences of its solutions) that it probably constitutes a dinaphthoperylene, probably of the structure represented by Formula II. Its formation may be illustrated by the following scheme:

By causing aluminium chloride to act during a short time upon chrysene in chlorobenzene there is, furthermore, obtainable a colorless hydrocarbon which crystallizes from glacial acetic acid in the form of small leaflets melting at 187° C. It may be transformed by the further action of aluminium chloride into the above-mentioned yellow hydrocarbon. This colorless hydrocarbon probably constitutes the 2.2'-dichrysenyl (Formula I).

Products having a character similar to that of the products characterized by Formulae I and II may also be obtained from the hitherto known mono- and dihalogen-chrysenes by reaction with aluminium chloride. The condensation takes place in some cases with elimination of hydrogen halide. Furthermore, it may be expected that a series of other chrysene derivatives is condensed by the action of aluminium chloride to form dimolecular compounds as illustrated by the above scheme.

The condensation of two chrysene radicals may be effected according to the present invention by warming the chrysene compounds with aluminium chloride or ferric chloride in the absence of solvents or in the presence of an indifferent solvent, such as benzene, toluene, chlorobenzene, carbon disulfide, or in a melt of aluminium chloride and common salt. In some cases it is possible to enhance the yield of pure products by using simultaneously dihydrogenating agents (for instance, by introducing oxygen or by addition of higher heavy metal oxides) since the hydrogen which is set free during the condensation always leads to the formation of non-crystallizing mixtures of hydrogenated hydrocarbons.

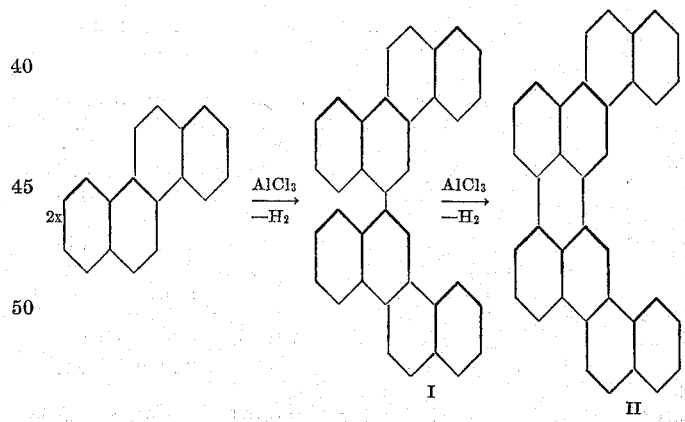

The new hydrocarbons of the present invention readily undergo the usual substitution reactions. Thus, for instance, there may be obtained by cautiously oxidizing the dinaphthoperylene (Formula II) with chromic acid in glacial acetic acid a quinone which crystallizes in the form of brilliant brown needles, melts at 286° C., dissolves in concentrated sulfuric acid to a red-violet solution and yields a brown-orange vat. By intensive oxidation a carboxylic acid is formed the sodium salt of which crystallizes from a sodium carbonate solution of 1 per cent. strength in the form of long yellow needles. On addition of hydrosulfite, the yellow alkaline solution of this carboxylic acid turns red; on shaking with air the solution again becomes yellow. This behaviour proves that the acid constitutes a quinone-carboxylic acid. By recrystallization from dichlorobenzene, this acid is obtained in the form of brownish-yellow needles which melt at 266° C. It dissolves in concentrated sulfuric acid to a pure green-blue solution.

By nitrating the dinaphthoperylene in glacial acetic acid at 30° C. to 100° C. with about two mols of nitric acid, a nitro-derivative is obtained which crystallizes from chlorobenzene in the form of greenish-yellow needles which become brown when exposed to light, and melt at 270° C. Nothing definite can be said about the structure of the hereindescribed substitution products.

The following examples serve to illustrate the invention, but they are not intended to limit it thereto, the parts are by weight:

(1) 400 parts of aluminium chloride are added to 200 parts of chrysene in 2000 parts of benzene and the whole is heated to boiling in a reflux apparatus for 3 hours on the water-bath. The dark carmine-red mass is then introduced into water and the benzene is expelled by means of steam. In order to eliminate the aluminium chloride, the orange to dark brown crude product, which is viscous when hot, is extracted several times with boiling dilute hydrochloric acid and then dried. The crude product (about 200 parts) is then stirred, while cold, with about 500 parts of acetone to form a yellow magma. It is filtered with suction and the solid matter is well washed with acetone until the acetone washings remain light yellow; the remaining lemon-yellow powder is dried. The product is obtained with a yield of 100 to 120 parts.

By recrystallization from chlorobenzene the thus obtained condensation product forms golden-yellow needles which have the constant melting point of 240° C. The product dissolves in organic solvents to yellow solutions which show intense olive to yellow-green fluorescence. In concentrated sulfuric acid the product dissolves only gradually to a solution which shows after some time an intense carmine-red color with an intense brown fluorescence. The molecular weight of the condensation product amounts to about 450, this being the mean value of 2 determinations (in camphor according to Rast's method and in orthodichlorobenzene according to the boiling point method). From its properties and from the molecular weight determination, the product probably constitutes a dinaphthoperylene, formed from 2 molecules of chrysene with elimination of 4 atoms of hydrogen. This conception is in accordance with the result of the elementary analysis.

The same product is formed by using, instead of benzene, another solvent which is indifferent to aluminium chloride, such as chlorobenzene or carbon disulfide.

(2) 40 parts of chrysene are stirred with 80 parts of aluminium chloride and 250 parts of chlorobenzene in the course of a quarter of an hour at 120° C. On decomposition of the intensely violet mass with water, a brownish-orange chlorobenzene solution is obtained which is separated from the aqueous portion. The chlorobenzene is then expelled by means of steam and the red-brown residue is dried. By sublimation in a vacuum at about 300° C. this crude product yields 12 to 15 parts of a nearly colorless crystalline sublimate, having only a feebly yellow color owing to the presence of traces of the compound described in Example 1. By recrystallization from glacial acetic acid colorless brilliant small leaflets are obtained which melt at 187° C. and dissolve gradually in concentrated sulfuric acid to a colorless solution. On warming this product with AlCl₃ in chlorobenzene or benzene, the solution assumes the same intense carmine-red color as in the case of chrysene. The finally formed product is probably identical with that described in Example 1.

By oxidizing this colorless hydrocarbon with chromic acid in glacial acetic acid a golden-yellow quinone is obtained which is insoluble in hot caustic soda solution but easily yields an orange-red vat. It crystallizes from glacial acetic acid in the form of golden-yellow needles and dissolves in concentrated sulfuric acid to an olive solution.

(3) 30 parts of 2,8-dichlorochrysene, melting at 268° C., are stirred with 300 parts of benzene and 60 parts of pulverized aluminium chloride whereby, even without warming, the whole assumes an intense violet color. On subsequent warming to 70° C. a lively evolution of hydrogen chloride takes place. The whole is stirred at this temperature for 2 to 3 hours, then decomposed with water and the crude reaction product is isolated as indicated in the foregoing examples. The dried crude product, which is resinous, is stirred with benzene whereby it decomposes to a brownish-orange solid product which is filtered with suction and washed with benzene. The yield amounts to 10 to 12 parts. By recrystallizing this condensation product from toluene or chlorobenzene orange small needles are obtained. This condensation product contains chlorine and probably constitutes a chloro-derivative of the dinaphthoperylene described in Example 1. It dissolves gradually in concentrated sulfuric acid to a fuchsine-red solution having a brown fluorescence.

According to the same method products of similar properties may be obtained from monochloro-, monobromo- and 2,8-dibromo-chrysene.

We claim:

1. The process which comprises causing a condensing agent of the group consisting of aluminum chloride and ferric chloride to act on a compound selected from the group consisting of chrysene, monohalogenated chrysene and dihalogenated chrysene.

2. The process which comprises causing aluminum chloride to act on a compound selected from the group consisting of chrysene, monohalogenated chrysene and dihalogenated chrysene.

3. The process as defined in claim 2, in which the reaction is effected in the presence of an inert solvent.

4. The process which comprises boiling for about 3 hours chrysene with aluminium chloride in benzene 5. The process which comprises heating at about 120° C. for about a quarter of an hour chrysene with aluminium chloride in chlorobenzene.

6. The process which comprises heating at about 70° C. for some hours 2,8-dichlorochrysene with aluminium chloride in benzene.

7. The compound of the formula:

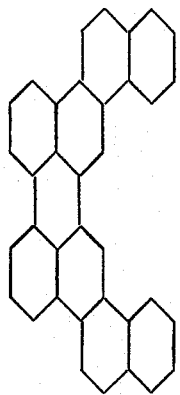

crystallizing from chlorobenzene in the form of golden-yellow needles which melt at 240° C.

8. The compound of the formula:

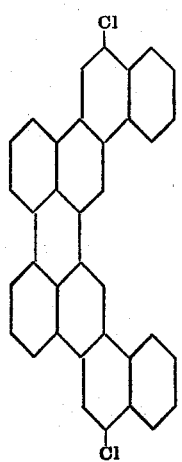

crystallizing from chlorobenzene in the form of orange needles, dissolving in concentrated sulfuric acid gradually to a fuchsine-red solution having a brown fluorescence.

9. The compounds of the general formula:

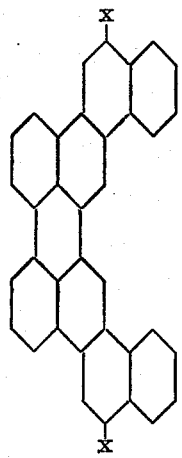

wherein X represents a member of the group consisting of hydrogen and halogen.

HEINRICH VOLLMANN.
HANS BECKER.